US012606681B2

(12) United States Patent　　　　(10) Patent No.:　US 12,606,681 B2
Chung et al.　　　　　　　　　　　　(45) Date of Patent:　　　Apr. 21, 2026

(54) PAINT PROTECTION FILM AND METHOD OF MANUFACTURING SAME

(71) Applicant: MICROWORKS CO., LTD., Iwol-myeon (KR)

(72) Inventors: Sungjin Chung, Suwon-si (KR); Kweon Hyung Han, Suwon-si (KR); Kwangho Jang, Suwon-si (KR); Sang Mook Kim, Suwon-si (KR)

(73) Assignee: MICROWORKS CO., LTD., Iwol-myeon (KR)

( * ) Notice: Subject to any disclaimer, the term of this patent is extended or adjusted under 35 U.S.C. 154(b) by 247 days.

(21) Appl. No.: 18/133,785

(22) Filed: Apr. 12, 2023

(65) Prior Publication Data

US 2023/0392042 A1　　Dec. 7, 2023

(30) Foreign Application Priority Data

Jun. 3, 2022　　(KR) ......................... 10-2022-0068225

(51) Int. Cl.
| | |
|---|---|
| *C08J 5/18* | (2006.01) |
| *B29C 48/00* | (2019.01) |
| *B29C 48/08* | (2019.01) |
| *B29K 77/00* | (2006.01) |
| *B29K 105/00* | (2006.01) |
| *B32B 27/06* | (2006.01) |
| *B32B 27/28* | (2006.01) |
| *B32B 27/34* | (2006.01) |

(52) U.S. Cl.
CPC ............. *C08J 5/18* (2013.01); *B29C 48/0011* (2019.02); *B29C 48/022* (2019.02); *B29C 48/08* (2019.02); *B32B 27/06* (2013.01); *B32B*

*27/285* (2013.01); *B32B 27/34* (2013.01); *B29K 2077/00* (2013.01); *B29K 2105/0085* (2013.01); *C08J 2377/06* (2013.01)

(58) Field of Classification Search
CPC ... B29C 48/0011; B29C 48/022; B29C 48/08; B29K 2077/00; B29K 2105/0085; B32B 27/06; B32B 27/285; B32B 27/34; C08J 2377/00; C08J 2377/06; C08J 5/18; C09D 177/06; C08L 77/00
See application file for complete search history.

(56) References Cited

FOREIGN PATENT DOCUMENTS

| | | | |
|---|---|---|---|
| CN | 108472935 A | 8/2018 | |
| CN | 109385223 A　* | 2/2019 | .............. C09J 11/06 |
| CN | 111684032 A | 9/2020 | |

(Continued)

*Primary Examiner* — John D Freeman
(74) *Attorney, Agent, or Firm* — NSIP Law

(57) ABSTRACT

Disclosed is a paint protection film having a storage modulus measured at a temperature of n ° C. according to ASTM D4065 of En, where n is a number representing a temperature in degrees Celsius, wherein E40/E20 is 0.75 or more and 1.1 or less, wherein the paint protection film has a change index dYI of yellowness according to ASTM E313 before and after a UV irradiation, represented by Equation 1 below, of 0.8 or less, where the UV irradiation is performed for 72 hours at an output of 3 W with a light having wavelength from 280 nm to 360 nm:

$$dYI = |YI - UV\_YI|$$　　　　[Equation 1]

in Equation 1, YI is the yellowness of the paint protection film before the UV irradiation, and UV_YI is the yellowness of the paint protection film after the UV irradiation.

3 Claims, 2 Drawing Sheets

(56)                References Cited

FOREIGN PATENT DOCUMENTS

| CN | 113501987 | A | | 10/2021 |
|----|-----------|---|---|---------|
| JP | 2011-240513 | A | | 12/2011 |
| JP | 2023-18663 | A | | 2/2023 |
| KR | 10-2116376 | B | | 5/2020 |
| KR | 10-2137810 | B1 | | 7/2020 |
| KR | 10-2286935 | B1 | | 8/2021 |
| KR | 102286935 | B | * | 8/2021 |
| KR | 10-2021-0126280 | A | | 10/2021 |
| KR | 10-2022-0011849 | A | | 2/2022 |
| KR | 10-2469241 | B1 | | 11/2022 |
| KR | 10-2469245 | B1 | | 11/2022 |
| TW | 202136366 | A | | 10/2021 |
| WO | WO 2018/079161 | A1 | | 5/2018 |

* cited by examiner

PAINT PROTECTION FILM AND METHOD OF MANUFACTURING SAME

CROSS-REFERENCE TO RELATED APPLICATION

This application claims the benefit under 35 U.S.C. 119(a) of Korean Patent Application No. 10-2022-0068225 filed on Jun. 3, 2022 in the Korean Intellectual Property Office, the entire disclosure of which is incorporated herein by reference for all purposes.

BACKGROUND

1. Field

The present disclosure relates to a paint protection film and a method of manufacturing the same.

2. Description of Related Art

Conventionally, in order to protect a painted surface coated on the exterior of a car, and the like, a film laminate containing materials such as polyurethane (TPU) and polyvinyl chloride (PVC) has been attached. However, elastic properties of the film laminate such as polyurethane and polyvinyl chloride are considerably changed according to the external environment, in particular, a temperature change during attachment work on the painted surface, causing obstacles to application work. In winter, internal air conditioning and local heating devices are provided to separately manage the temperature of the work area, but there are shortcomings in work convenience, completeness, and quality.

In addition, there is a concern that the polyurethane, polyvinyl chloride, and the like may continue to cause discoloration to an extent that an exterior color is visually observed after painting the painted surface due to problems such as yellowing caused by the characteristics of a fabric. In order to improve this phenomenon, light resistance enhancement has been attempted on an outermost surface coating layer of a fabric film and the film laminate, an adhesive layer, etc., but this yellowing phenomenon is still a problem after application to the painted surface.

Furthermore, films such as polyurethane and polyvinyl chloride, and laminates thereof are mostly composed of crude oil-based raw materials, and do not satisfy eco-friendliness.

The foregoing background art is technical information that the inventor has possessed for derivation of an embodiment or acquired during the derivation process, and cannot necessarily be referred to as known technology disclosed to the general public prior to filing the present invention.

SUMMARY OF THE INVENTION

In one general aspect, a paint protection film according to an embodiment has a storage modulus measured at a temperature of n ° C. according to ASTM D4065 of En, where n is a number representing a temperature in degrees Celsius, wherein E40/E20 is 0.75 or more and 1.1 or less.

The paint protection film may have a tear strength of 500 gf or more and 800 gf or less.

The paint protection film may have a change index dYI of yellowness according to ASTM E313 before and after a UV irradiation, represented by Equation 1 below, of 0.8 or less, where the UV irradiation is performed for 72 hours at an output of 3 W with a light having wavelength from 280 nm to 360 nm:

$$dYI=|YI-UV\_YI| \qquad \text{[Equation 1]}$$

in Equation 1, YI is the yellowness of the paint protection film before the UV irradiation, and UV_YI is the yellowness of the paint protection film after the UV irradiation.

The E50/E20 of the paint protection film may be 0.7 or more and 1 or less.

The E0/E20 of the paint protection film may be 1 or more and 1.5 or less.

The E0 of the paint protection film may be 30 MPa or more and 130 MPa or less.

The E50 of the paint protection film may be 20 MPa or more and 100 MPa or less.

The tear strength of the paint protection film may be 550 gf or more and 750 gf or less.

The paint protection film may have the yellowness of 1.2 or less according to ASTM E313 after the UV irradiation.

The paint protection film may include a polyether block amide copolymer.

In another general aspect, a paint protection film according to another embodiment includes a polyether block amide copolymer, wherein the polyether block amide copolymer has a crude oil-based material content of 85 wt % or less.

The paint protection film may have a storage modulus measured at a temperature of n ° C. according to ASTM D4065 is En, where n is a number representing a temperature in degrees Celsius, wherein E10/E20 is 0.9 or more and 1.3 or less.

The paint protection film may have a tear strength of 500 gf or more and 800 gf or less.

The paint protection film may have a yellowness according to ASTM E313 after a UV irradiation of 1.2 or less, where the UV irradiation is performed for 72 hours at an output of 3 W with a light having wavelength from 280 nm to 360 nm.

A paint protection film laminate according to another embodiment may include the paint protection film and a release film disposed on one side of the paint protection film.

In still another general aspect, a method of manufacturing a paint protection film according to another embodiment includes: preparing a raw material including a polyether block amide copolymer; melting and extruding the raw material to form a paint protection sheet; and preparing a laminate by forming a carrier film laminate by disposing the paint protection sheet on a carrier film, and compressing and winding the carrier film laminate, wherein the carrier film has a tension of 2000 kPa or more and 4200 kPa or less.

A temperature for the melting may be 200° C. to 300° C.

The compressing may be performed by passing the carrier film laminate between a plurality of rollers.

A painted article according to another embodiment may include the paint protection film attached to a surface of the painted article painted with a paint.

Other features and aspects will be apparent from the following detailed description and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION OF EXEMPLARY EMBODIMENTS

Figure 1A:
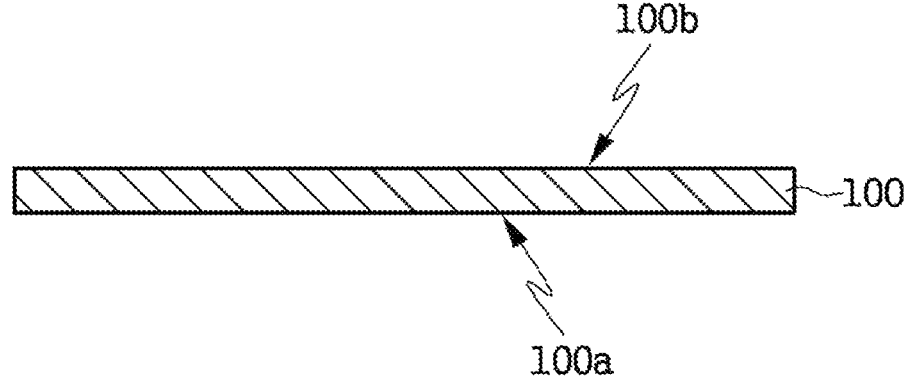
FIG. 1A is a partial drawing showing an example of a paint protection film 100 according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

In this disclosure, when a certain component "includes" another component, this means that it may further include other components without excluding other components unless otherwise specified.

In this disclosure, when a component is said to be "connected" to another component, this includes not only the case of being 'directly connected,' but also the case of being 'connected with another component intervening therebetween.'

In this disclosure, the meaning that B is located on A means that B is located directly on A, or B is located on A while another layer is located therebetween, it is not interpreted as being limited to the location of B in contact with the surface of A.

In this disclosure, the term "combination thereof" included in the expression of the Markush form means a mixture or combination of one or more selected from the group consisting of the components described in the expression of the Markush form, and from the group consisting of the components, and it means including one or more selected from the group consisting of the above components.

In this disclosure, description of "A and/or B" means "A, B, or A and B."

In this disclosure, terms such as "first" and "second" or "A" and "B" are used to distinguish the same terms from each other unless otherwise specified.

In this disclosure, a singular expression is interpreted as a meaning including a singular number or a plurality interpreted in context unless otherwise specified.

The present invention is directed to providing a paint protection film having a low change in physical properties according to changes in an external environment (temperature) compared to films such as polyurethane and polyvinyl chloride, which are conventionally used for protecting painted surfaces, and a method of manufacturing the same.

The present invention is also directed to providing an environmentally friendly paint protection film having excellent yellowing resistance and a low content of crude oil-based raw materials, and a method of manufacturing the same.

The paint protection film according to an embodiment has low changes in physical properties and a storage modulus according to changes in an external environment (temperature), and excellent yellowing resistance, so it is suitable for use in protecting painted surfaces.

The paint protection film according to an embodiment has a low content of crude oil-based raw materials, and thus may have high eco-friendliness.

Paint Protection Film 100

In order to achieve the above object, a paint protection film 100 according to an embodiment is provided, in which a storage modulus measured at a temperature of n ° C. according to ASTM D4065 is En, where n is a number representing a temperature in degrees Celsius, E40/E20 is 0.75 or more and 1 or less.

The tear strength of the paint protection film may be 500 gf or more and 800 gf or less, A change index dYI of yellowness according to ASTM E313 before and after UV irradiation, represented by Equation 1 below, may be 0.8 or less, and the UV irradiation is performed for 72 hours at an output of 3 W with light of any one wavelength from 280 nm to 360 nm.

$$dYI=|YI-UV\_YI| \qquad \text{[Equation 1]}$$

in Equation 1, YI is the yellowness of the paint protection film before the UV irradiation, and UV_YI is the yellowness of a paint protection film after the UV irradiation.

The paint protection film 100 may include a polyether block amide copolymer, and the polyether block amide copolymer may be a copolymer of a polyether block and a polyamide block, and may be named PEBA or the like.

The paint protection film 100 has a feature that the change in a storage modulus is not large at a higher temperature (40-50° C.) or a lower temperature (0-10° C.), compared to a storage modulus at 20° C. or 25° C. Due to this feature, the paint protection film and the paint protection film laminate including the same do not require a separate local cooling or heating device when attached to a painted surface of an article to be protected, and can be stably applied.

When the storage modulus measured at a temperature of n ° C. according to ASTM D4065 is En, the paint protection film 100 may have the following storage modulus ratios.

In the coating protection film 100, a ratio E50/E20 of a storage modulus E50 measured at ° C. to a storage modulus E20 measured at 20° C. may be 0.7 or more, 0.73 or more, or 0.75 or more. The E50/E20 may be 1.1 or less, 1 or less, or 0.95 or less.

In the coating protection film 100, a ratio E40/E20 of a storage modulus E40 measured at ° C. to a storage modulus E20 measured at 20° C. may be 0.75 or more, 0.78 or more, or 0.8 or more. The E40/E20 may be 1.05 or less, 1 or less, or 0.98 or less.

Since the paint protection film 100 has such E50/E20 and E40/E20 ratios, it can be stably applied to a painted surface of the article to be protected in a working environment exposed to a relatively high temperature, and can exhibit good quality.

In the coating protection film 100, a ratio E30/E20 of a storage modulus E30 measured at 30° C. to a storage modulus E20 measured at 20° C. may be 0.8 or more or 0.85 or more. The E30/E20 may be 1.2 or less, or 1.1 or less.

In the coating protection film 100, a ratio E10/E20 of a storage modulus E10 measured at ° C. to a storage modulus E20 measured at 20° C. may be 0.9 or more, 0.95 or more, or 0.98 or more. The E10/E20 may be 1.3 or less, or 1.2 or less.

In the coating protection film 100, a ratio E0/E20 of a storage modulus E0 measured at ° C. to a storage modulus E20 measured at 20° C. may be 1 or more, 1.05 or more, or 1.1 or more. The E0/E20 may be 1.5 or less, 1.4 or less, or 1.35 or less.

Since the paint protection film 100 has such E10/E20 and E0/E20 ratios, it can be stably applied to a painted surface of the article to be protected in a working environment exposed to a relatively cold temperature, and can exhibit good quality.

The storage modulus E20 of the paint protection film 100 measured at 20° C. may be 25 MPa or more, 110 MPa or less, or 100 MPa or less.

The storage modulus E30 of the paint protection film 100 measured at 30° C. may be 25 MPa or more, 30 MPa or more, 110 MPa or less, or 100 MPa or less.

The storage modulus E40 of the paint protection film 100 measured at 40° C. may be 20 MPa or more, 25 MPa or more, 100 MPa or less, or 90 MPa or less.

The storage modulus E50 of the paint protection film 100 measured at 50° C. may be 20 MPa or more, 25 MPa or more, 100 MPa or less, or 90 MPa or less.

The storage modulus E10 of the paint protection film 100 measured at 10° C. may be 25 MPa or more, 30 MPa or more, 120 MPa or less, or 110 MPa or less.

The storage modulus E0 of the paint protection film 100 measured at 0° C. may be 30 MPa or more, 35 MPa or more, 130 MPa or less, or 120 MPa or less.

The paint protection film 100 may have a change index dYI of yellowness represented by Equation 1 of 0.8 or less, 0.7 or less, or 0.5 or less. The dYI may be 0.05 or more, or 0.1 or more.

By having such a dYI value, the paint protection film 100 may have durability in which yellowing hardly occurs even when exposed to ultraviolet rays.

The paint protection film 100 may have a yellowness of 0.5 or more, 0.6 or more, 1.2 or less, or 1.1 or less according to ASTM E313 after UV irradiation.

By having a yellowness after such UV irradiation, the paint protection film 100 may have an appearance with little yellowing even when exposed to ultraviolet rays.

The paint protection film 100 may have an L* value of 90 or more and 99.9 or less according to CIE Lab color space.

The paint protection film 100 may have an a* value of −0.01 or more or and exceeding 0 according to CIE Lab color space. The a* value may be 0.2 or less, or 0.1 or less.

The paint protection film 100 may have a b* value of 0.1 or more and 0.18 or more according to CIE Lab color space. The b* value may be 0.6 or less, or 0.5 or less.

The paint protection film 100 may have an a* value of −0.2 or more and −0.1 or more according to CIE Lab color space after the UV irradiation. The a* value may be 0.1 or less, or 0 or less.

The paint protection film 100 may have a b* value of 0.25 or more and 0.3 or more according to CIE Lab color space after the UV irradiation. The b* value may be 0.2 or more, or 0.3 or more.

L*, a*, b* values according to the CIE Lab color space may be measured according to ASTM E313.

The tear strength of the paint protection film 100 may be 500 gf or more, 550 gf or more, or 580 gf or more. The tear strength may be 800 gf or less, 750 gf or less, or 720 gf or less. The tear strength can be measured after fixing both ends of a sample obtained from the coating protection film to an UTM tester jig of Kyungjin Hitech Co. The sample may have a size of 50 mm×100 mm and a thickness of 150 μm.

Since the paint protection film 100 has such tear strength, it can be easily applied to painted articles having various curved surfaces and can satisfy good durability.

The paint protection film 100 may have an impact strength of 3500 kJ/m² or more, 4500 kJ/m² or more, 5000 kJ/m² or more, or 10000 kJ/m² or less according to JIS K 7160. By having such impact strength, it can absorb shock from the outside to some extent but not be easily deformed or damaged.

The paint protection film 100 may have a visible light transmittance of 85% or more, 88% or more, or 90% or more. The paint protection film may have a visible light transmittance of 99.99% or less. The paint protection film having this characteristic ensures that appearance is maintained and stably protected when applied to the painted surface of an article to be protected.

The paint protection film 100 may have a good Ra roughness value. When considering the largest value of a surface roughness value Ra1 of one side of the paint protection film and a surface roughness value Ra2 of the other side as a maximum roughness value, the maximum roughness value may be 0.5 μm or less, 0.2 μm or less, or 0.1 μm or less. The maximum roughness value may be greater than 0 μm or greater than 0.001 μm. In this way, when the maximum roughness value is controlled to a predetermined level, optical properties of the paint protection film may be improved.

Exemplarily, one surface of the paint protection film 100 may be a surface in contact with a carrier film 92 to be described later, and the other surface may be a surface in contact with a separate protection film 94 or a roll-type device (such as a squeezing roll) in the manufacturing process.

The Ra1 and Ra2 may be controlled by adjusting a surface roughness of a film, member, or device in contact with one side or the other side of a sheet, from which a raw material is extruded during a manufacturing process of the paint protection film.

A Shore D hardness of the paint protection film 100 may be 20 or more, 30 or more, 75 or less, or 70 or less. By having such Shore D hardness, it is possible to have good scratch resistance together with elastic properties.

The paint protection film 100 may have an intrinsic viscosity of 0.8 or more and 2.5 or less as measured by meta-cresol at 25° C. according to ISO 307:2019.

The paint protection film 100 may have a form, in which thickness is constantly controlled within ±5% of the standard. The paint protection film may be extruded.

The thickness of the paint protection film 100 may be 2000 μm or less, 1500 μm or less, or 1000 μm or less. The thickness may be 1 μm or more or 50 μm or more. By having such a thickness, yellowing resistance can be secured while having the storage modulus ratio characteristics described above, and it can be easily applied to a painted surface.

A polyether block amide copolymer of the paint protection film 100 may include a rigid region and a flexible region in a chain. The rigid region may be expressed as a semi-crystal region. The soft region may be expressed as an amorphous region.

The polyether block amide copolymer simultaneously includes a polyamide region, which is the rigid region, and a polyether region, which is the soft region, so that the paint protection film 100 can be made to have relatively strong mechanical strength, and at the same time, flexible characteristics and/or viscoelasticity characteristics.

The polyether block amide copolymer may be a combination of polyamide containing two or more carboxyl groups in a molecule and ether containing two or more hydroxyl groups in a molecule.

The polyether block amide copolymer may be obtained by condensation polymerization of a polyether block including a reactive end and a polyamide block including a reactive end.

The polyether block amide copolymer may be a condensation polymer including a polyamide block having a dicarboxyl end and a polyoxyalkylene block having a diamine end. The polyoxyalkylene block may be obtained by cyanoethylation and hydrogenation of an aliphatic $\alpha,\omega$-dihydroxylated polyoxyalkylene block known as polyetherdiol.

The polyether block amide copolymer may be a condensation polymer including a polyamide block having a dicarboxyl end and a polyetherdiol block. In this case, the polyether block amide may be polyetheresteramide.

Exemplarily, a polyamide block including dicarboxyl chain ends may include a condensation polymer of a polyamide precursor in the presence of a chain limiting dicarboxylic acid. Exemplarily, a polyamide block including diamine chain ends may include a condensation polymer of a polyamide precursor in the presence of a chain-limiting diamine.

Exemplarily, the polyamide block including dicarboxylic chain ends may include a condensation polymer of an $\alpha,\omega$-aminocarboxylic acid, a lactam, or a dicarboxylic acid and diamine in the presence of a chain-limiting dicarboxylic acid. Polyamide 12 or Polyamide 6 may be applied as the polyamide block.

The polyether block amide copolymer may include blocks having a randomly distributed unit structure. Exemplarily, the following three types of polyamide blocks may be applied.

In the first type, the polyamide block may include a condensation polymer of a carboxylic acid and an aliphatic or aryl aliphatic diamine. The carboxylic acid may have 4 to 20 carbon atoms, and may have 6 to 18 carbon atoms. The aliphatic or aryl aliphatic diamine may have 2 to 20 carbon atoms, and may have 6 to 14 carbon atoms.

The dicarboxylic acid may include, for example, 1,4 cyclohexanedicarboxylic acid, 1,2-cyclohexyldicarboxylic acid, 1,4-butanedioic acid, adipic acid, azelaic acid, suberic acid, sebacic acid, 1,12-dodecanedicarboxylic acid, 1,14-tetradecanedicarboxylic acid, 1,18-octadecanedicarboxylic acid, terephthalic acid, isophthalic acid, haphthalenedicarboxylic acid, a dimerized fatty acid, and the like.

The diamine may include, for example 1,5-tetramethylenediamine, 1,6-hexamethylenediamine, 1,10-decamethylenediamine, 1,12-dodecamethylenediamine, trimethyl-1,6-hexamethylenediamine, 2-methyl-1,5-pentamethylenediamine), isomers of bis(3-methyl-4-aminocyclohexyl) methane (BMACM), 2,2-bis(3-methyl-4-aminocyclohexyl)propane (BMACP), bis(para-aminocyclohexyl)methane (PACM), isophoronediamine (IPD), 2,6-bis(aminomethyl)norbornane (BAMN), piperazine (Pip), meta-xylylenediamine (MXD) and para-xylylenediamine (PXD), and the like.

The first type of polyamide block may include PA 412, PA 414, PA 418, PA 610, PA 612, PA 614, PA 618, PA 912, PA 1010, PA 1012, PA 1014, PA 1018, MXD6, PXD6, MXD10 or PXD10.

The second type of polyamide block may include a condensation polymer of one or more $\alpha,\omega$-aminocarboxylic acids and/or one or more lactams having 6 to 12 carbon atoms in the presence of a dicarboxylic acid or a diamine having 4 to 12 carbon atoms. Examples of the lactam include caprolactam, oenantholactam, lauryllactam, and the like. Examples of the $\alpha,\omega$-aminocarboxylic acid include aminocaproic acid, 7-aminoheptanoic acid, 11-aminoundecanoic acid, 12-aminododecanoic acid, and the like.

The second type of polyamide block may include Polyamide 11, Polyamide 12 or Polyamide 6.

The third type of polyamide block may include a condensation polymer of one or more $\alpha,\omega$-aminocarboxylic acids (or one or more lactams), one or more diamines and one or more dicarboxylic acids. In this case, the polyamide block can be prepared by condensation polymerization of a diamine, a diacid and a comonomer (or comonomers) as follows.

As the diamine, for example, a linear aliphatic diamine, an aromatic diamine, a diamine having X number of carbon atoms, and the like can be applied. As the diacid, for example, a dicarboxylic acid, an acid having Y number of carbon atoms, and the like can be applied. A comonomer or comonomers {Z} may be selected from mixtures containing lactams having Z carbon atoms, $\alpha,\omega$-aminocarboxylic acids, and one or more diamines having X1 carbon atoms and one or more dicarboxylic acids having Y1 carbon atoms in substantially equal moles. However, (X1, Y1) is different from (X, Y).

The comonomer or comonomers {Z} may be included in an amount of 50 wt % or less, 20 wt % or less, or 10 wt % or less, based on the total amount of combined polyamide precursor monomers.

The condensation reaction according to the third type may proceed in the presence of a chain limiting agent selected from dicarboxylic acids. A dicarboxylic acid having Y number of carbon atoms may be used as the chain limiting agent, and the dicarboxylic acid may be introduced in a stoichiometrically excessive amount relative to the one or more diamines.

As an alternative form of the third type, the polyamide block can include condensation polymers of two or more $\alpha,\omega$-aminocarboxylic acids having 6 to 12 carbon atoms, two or more lactams, or lactams and aminocarboxylic acids with different numbers of carbon atoms, optionally in the presence of the chain limiting agent.

Examples of the aliphatic $\alpha,\omega$-aminocarboxylic acid include aminocaproic acid, 7-aminoheptanoic acid, 11-aminoundecanoic acid, 12-aminododecanoic acid, and the like.

The lactam may include, for example, caprolactam, onanthollactam, or lauryllactam.

The aliphatic diamine may include, for example, hexamethylenediamine, dodecamethylene-diamine, trimethylhexamethylenediamine, and the like.

The alicyclic diacid may include, for example, 1,4-cyclohexanedicarboxylic acid.

The aliphatic diacid may include, for example, butanedioic acid, adipic acid, azelaic acid, suberic acid, sebacic acid, a dodecane dicarboxylic acid, a dimer fatty acid (dimer ratio 98% or more; hydrogenated ones; those sold under the trade name Pripol by Uniqema or Empol by Henkel) a polyoxyalkylene-$\alpha,\omega$-diacid, and the like.

The aromatic diacid may include, for example, terephthalic acid or isophthalic acid.

The cycloaliphatic diamine may include, for example, isomers of bis(3-methyl-4-aminocyclohexyl)methane (BMACM) and 2,2-bis(3-methyl-4-aminocyclohexyl)propane (BMACP), bis(para-aminocyclohexyl)methane (PACM), and the like.

Other diamines may include, for example, isophoronediamine (IPD), 2,6-bis(aminomethyl)norbornane (BAMN), piperazine, and the like. Examples of an aryl aliphatic diamine include, but are not limited to, meta-xylylenediamine (MXD) and para-xylylenediamine (PXD).

Examples of the third type of polyamide block include PA 66/6 and PA 66/610/11/12. In the PA 66/6, 66 represents a hexamethylenediamine unit condensed with adipic acid, and 6 represents a unit introduced by condensation of caprolactam.

In PA 66/610/11/12, 66 represents a hexamethylenediamine unit condensed with adipic acid, 610 represents a hexamethylenediamine unit condensed with sebacic acid; 11 represents a unit introduced by condensation of aminoundecanoic acid, and 12 represents a unit introduced by condensation of lauryllactam.

As the polyether block, for example, one or more polyalkylene ether polyols, in particular polyalkylene ether diols, are preferably selected from polyethylene glycol (PEG), polypropylene glycol (PPG), polytrimethylene glycol (PO3G), polytetramethylene glycol (PTMG) and mixtures of or copolymers thereof. The polyether block may include a polyoxyalkylene sequence containing $NH_2$ chain ends, and the sequence may be introduced by cyanoacetylation of an aliphatic $\alpha,\omega$-dihydroxy polyoxyalkylene sequence known as polyetherdiol. Specifically, Jeffamine (e.g., Jeffamine® D400, D2000, ED2003 or XTJ542, commercially available from Huntsman) may be used.

The one or more polyether blocks may preferably include polyalkylene ether polyols such as PEG, PPG, PO3G, and PTMG, polyethers containing $NH_2$ at the chain end and a polyoxyalkylene sequence, copolymers (ether copolymers) having a random arrangement and/or block arrangement thereof, and one or more polyethers selected from mixtures thereof.

The polyether block may be produced from any one of polyethylene glycol, polypropylene glycol, polytetramethylene glycol, and combinations thereof. The polyether block may be copolymerized with a polyamide block containing a carboxyl end to form a polyether block amide. The polyether block may be aminated to convert to polyetherdiamine, and then condensed with the polyamide block having the carboxyl end to form the polyether block amide. The polyether block may be mixed with a polyamide precursor and a chain limiting agent to form the polyether block amide including statistically dispersed units.

Examples of the polyether include polyethylene glycol (PEG), polypropylene glycol (PPG), or polytetramethylene glycol (PTMG). Polytetramethylene glycol is also known as polytetrahydrofuran (PTHF). The polyether block may be introduced into a polyether block amide chain from a diol or diamine form, and the polyether block is referred to as a PEG block, a PPG block or a PTMG block.

A number average molar mass of the polyamide block may be 300 g/mol to 15,000 g/mol or 600 g/mol to 5000 g/mol. The polyether block may have a number average molar mass of 100 g/mol to 6000 g/mol or 200 g/mol to 3000 g/mol.

The number average molar mass ratio of the polyamide block and the polyether block of a polyether block amide copolymer may be 1:0.25 to 1, and the number average molar mass of the polyamide block and the polyether block of the copolymer may be 1000/1000, 1300/650, 2000/1000, 2600/650 or 4000/1000.

The content of the polyether block may be 10 wt % to 80 wt %, 40 wt % to 80 wt %, or 60 wt % to 80 wt % based on the total weight of the polyether block amide copolymer.

The content of the polyamide block may be 10% to 60 wt % or 15% to 45 wt % based on the total weight of the polyether block amide copolymer.

The content can be interpreted as a statistical distribution within a polymer chain.

Examples of the polyether block amide copolymer include, but are not limited to, Arkema's Pebax®, Pebax® Rnew®, and EVONIK's VESTAMID® E.

The paint protection film 100 may be superior in eco-friendliness compared to films such as polyurethane and polyvinyl chloride. The paint protection film 100 may have a crude oil-based material content of 85 wt % or less, 70 wt % or less, 55 wt % or less, 35 wt % or less, or 5 wt % or more. The paint protection film may include a residual amount of an eco-friendly raw material-derived material in addition to materials based on crude oil.

As the eco-friendly raw material-derived material, a material extracted from a vegetable raw material may be exemplarily applied, and the eco-friendly raw material-derived material may be a material derived from castor oil extracted from castor seeds.

A measurement of the content of the eco-friendly raw material-derived material and crude oil-based material can be distinguished by a ratio of 14C and 12C carbon isotopes according to ASTM D6866. Fossil fuels and crude oil have a very high proportion of 12C isotopes, and a significant portion of radioactive carbon is decayed. However, eco-friendly, renewable raw materials, and vegetable raw materials have a higher isotope proportion of 14C.

Pebax® Rnew® and the like may be examples of applying eco-friendly raw materials, but are not limited thereto.

The paint protection film 100 can be easily applied to a painted article having a curved surface, and can be applied to protect painted automobile parts.

Paint Protection Film Laminate 190

A paint protection film laminate 190 according to the embodiment may include the following:

a paint protection film 100; and a carrier film 92 disposed on one surface 100a or the other surface 100b of the paint protection film.

The carrier film 92 may have a thickness of 50 μm to 250 μm, and may include, for example, polyethylene terephthalate in consideration of chemical resistance and dimensional stability.

The carrier film 92 may serve as a release film to be described later.

One surface of the carrier film 92 may directly contact the paint protection film 100.

During the manufacturing process of the paint protection film 100, a surface roughness of one surface of the carrier film 92 may be transferred to a surface in contact with the paint protection film.

A surface Ra roughness of one surface of the carrier film 92 may be 0.5 μm or less, 0.2 or less, or 0.1 or less. The surface Ra roughness may be 0.0001 μm or more, or 0.001 μm or more.

The carrier film 92 may have a lower haze value by having such surface Ra roughness.

The paint protection film laminate 190 may further include a protective film 94 disposed on the other surface 100b of the paint protection film 100.

The protective film 94 may include polyethylene, polyethylene terephthalate, or the like.

One surface of the protective film 94 may directly contact the other surface 100b of the paint protection film 100.

When the protective film 94 is applied during the manufacturing process of the paint protection film 100, the surface roughness of the other surface of the paint protection film may be affected by the surface roughness of one side of the protective film.

A surface Ra roughness of the one surface of the protective film 94 may be 0.5 μm or less, 0.2 μm or less, or 0.1 μm or less. The surface Ra roughness may be 0.0001 μm or more, or 0.001 μm or more.

The protective film 94 may have a lower haze value by controlling the surface roughness of the paint protection film 100 by having such surface Ra roughness.

Figure 2:
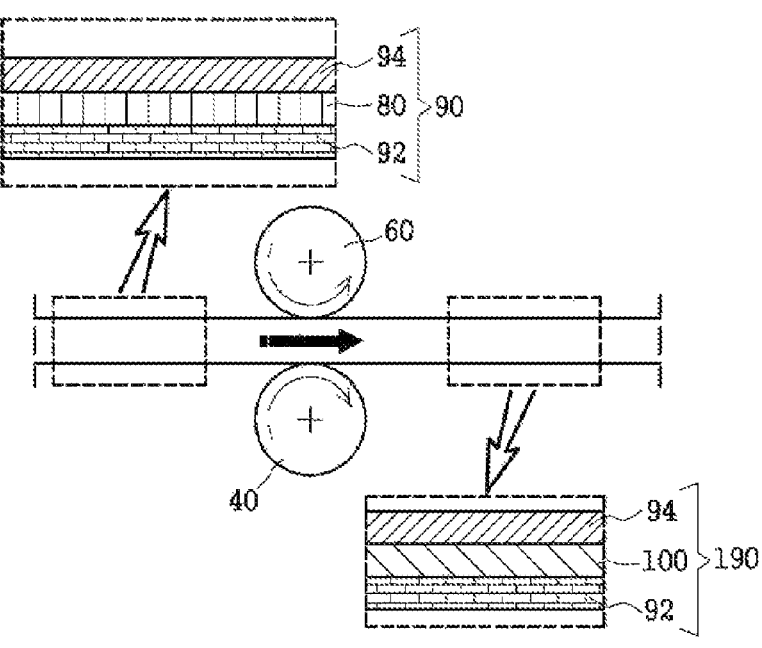
FIG. 2 is another partial drawing showing an example of a carrier film laminate 90 including a paint protection sheet, a compression process, and a paint protection film laminate 190 according to an embodiment.

As shown at the bottom of FIG. 2, the paint protection film laminate 190 may include a carrier film 92, a paint protection film 100 disposed on the carrier film, and a protective film 94 disposed on the paint protection film 100.

The paint protection film laminate 190 may further include an adhesive layer on one side or the other side of the paint protection film 100 as needed. The adhesive layer may be an optical adhesive layer having an excellent light transmittance and/or transparency. Exemplarily, a transparent adhesive layer having high adhesion to a curved or bent surface may be applied. Exemplarily, an optically clear adhesive (OCA), a pressure sensitive adhesive (PSA), or the like may be applied, but the present disclosure is not limited thereto.

The paint protection film laminate 190 may be formed by sequentially laminating a release film 120, an adhesive layer, and a paint protection film 100.

As the release film, a PET film may be exemplarily applied. In addition, the carrier film 92 or the protective film 94 described above may be applied as the release film 120.

Figure 1B:
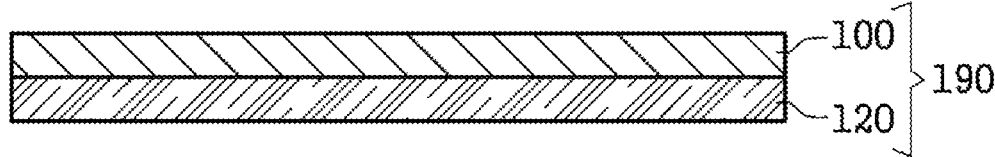
FIGS. 1B and 1C are drawings showing examples of paint protection film laminates 190 according to embodiments.
Figure 1C:
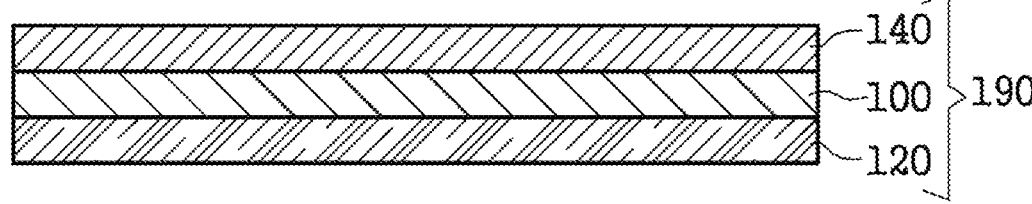

Referring to FIG. 1, the paint protection film laminate 190 may include the paint protection film 100 disposed on the release film 120 as shown in FIG. 1B. An adhesive layer may be further included between the release film 120 and the paint protection film 100, and the adhesive layer may be the same as the adhesive layer described above.

The paint protection film laminate 190 may not include a separate adhesive layer between the paint protection film 100 and the release film 120. At this time, the paint protection film 100 may be attached to the release film 120 by a fusion bonding method.

A PET film may be applied as the release film 120, and carrier film may serve as a release film 120. When the release film 120 is attached to a painted surface, it can be used after being removed.

The paint protection film laminate 190 may further include a hard coating layer 140 disposed on the paint protection film 100. Referring to FIG. 10, in the paint protection film laminate 190, the release film 120, the paint protection film 100, and the hard coating layer 140 may be sequentially laminated.

The hard coating layer 140 may impart strength and gloss sufficient for surface protection to the paint protection film laminate 190.

The paint protection film laminate 190 may have a haze of 2% or less, 1% or less, 0.8% or less, or 0.7% or less. The haze may be 0.01% or more. The paint protection film laminate 190 may exhibit excellent optical properties and transparency by having such haze characteristics.

The paint protection film laminate 190 has a relatively stable degree of change in storage modulus in a predetermined temperature range, and applies a paint protection film 100 having excellent tear strength characteristics. As a result, it is possible to suppress the occurrence of a lifting phenomenon with a part directly in contact with the paint protection film 100, and it is possible to exhibit a good appearance.

Method of Manufacturing Paint Protection Film

A method of manufacturing a paint protection film according to an embodiment includes:

a sheet forming step of preparing a raw material containing a polyether block amide copolymer, melting and extruding the raw material to form a paint protection sheet 80; and a laminate manufacturing step of preparing a carrier film laminate 90, in which the paint protection sheet 80 is disposed on a carrier film 92, and compressing and winding the carrier film laminate 90, The carrier film may have a tension of 2000 kPa or more and 4200 kPa or less.

In a sheet forming step, a polyether block amide copolymer may be the same as described above. As a raw material including the polyether block amide copolymer, Arkema's PEBAX®, Pebax® Rnew®, and Evonik's VESTAMID® E series may be applied.

In the melt extrusion of the sheet forming step, a melting temperature may be 200° C. to 300° C.

In the laminate manufacturing step, the carrier film laminate 90 that has been compressed may be one of the above-described paint protection film laminates 190.

In the method of manufacturing the paint protection film, when the carrier film laminate 90 further includes an additional layer such as an adhesive layer or a hard coating layer 140, a step of curing after laminating or coating the paint protection sheet 80 and the additional layer may be further included.

In the laminate manufacturing step, the paint protection sheet 80 of the carrier film laminate 90 may be processed into a paint protection film 100 through compression.

Compressing in the step of manufacturing the laminate may be performed by passing the carrier film assembly having the paint protection sheet 80 disposed on the carrier film 92 between rollers.

A tension of the carrier film 92 in the laminate manufacturing step may be 2000 kPa or more, 2200 kPa or more, or 2500 kPa or more. The tension may be 4200 kPa or less or 4000 kPa or less. By having such tension in the carrier film in the laminate manufacturing step, the occurrence of wrinkles in the paint protection sheet 80 and the paint protection film 100 in contact with the carrier film 92 is suppressed as much as possible, and it can help to obtain a film having related physical properties such as a tear strength suitable for application as a paint protection film.

Referring to FIG. 2, as the rollers, a first roller 40 and a second roller 60 may be applied with the carrier film laminate 90 interposed therebetween, the first roller 40 being a casting roller, and the second roller 60 being a squeezing roller.

One surface of the carrier film laminate 90 is pressed in contact with the casting roller 40, and the other surface of the carrier film laminate 90 is pressed in contact with the squeezing roller to be processed to a certain thickness. In the processing process, the carrier film laminate may further include a protective film 94 as needed. Specifically, the carrier film laminate 90 may include a carrier film 92, a paint protection sheet (or a paint protection film) 80 on the carrier film 92, and the protective film 94 disposed on the paint protection sheet 80.

Compressing in the laminate manufacturing step may prepare a paint protection film 100 controlled to have a predetermined thickness by manufacturing a paint protection sheet 80 having a certain thickness and passing it through rollers. A method of controlling a thickness of the paint protection film 100, a method of passing between rollers and controlling the thickness of the paint protection film 100, or the like, is applicable as long as it is applied in film manufacture, and detailed descriptions are omitted.

In the process of passing between the rollers, the surface roughness of the paint protection film 100 can be controlled. A surface roughness of one side of the paint protection film 100 may be controlled by a roughness of the carrier film 92 directly in contact with the one surface of the paint protection film 100. A surface roughness of the other surface of the paint protection film 100 may be controlled by a surface roughness of a squeezing roller directly in contact with the other surface of the paint protection film 100 or a surface roughness of the protective film 94. A surface roughness of one surface and the other surface of the paint protection film 100, a surface roughness of the carrier film 92, a surface roughness of the protective film 94, a surface roughness of the squeezing roller 60, and the like may be the same as those described above.

The method of manufacturing the paint protection film 100 may be performed so as to manufacture a paint protection film in a form of a laminate together with the carrier film 92 or the like, or the paint protection film 100 itself, from which the carrier film 92 or the like is removed.

The method of manufacturing the paint protection film 100 may further include removing the carrier film 92 from the paint protection film laminate 190 as needed.

The method of manufacturing the paint protection film 100 may further include disposing an adhesive layer on one surface of the paint protection film 100 as needed.

The method of manufacturing a paint protection film 100 may further include disposing a release film 120 on one surface of the paint protection film 100 as needed. The release film 120 may be the same as that described above. The release film 120 may be adhered to the paint protection film 100 directly or via a separately disposed adhesive layer, and may be removed when attached to the paint.

The method of manufacturing the paint protection film 100 may further include a step of disposing a hard coating layer 140 on one surface or the other surface of the paint protection film 100.

Painted Article

A painted article according to an embodiment may include the above-described paint protection film 100 attached to a surface of the painted article painted with a paint.

The painted article may have a plurality of curved surfaces, and may be, for example, an automobile exterior part.

The painted article may include a paint protection film laminate 190 attached to the painted surface.

Hereinafter, the present invention will be described in more detail through specific examples. The following examples are merely examples for facilitating the understanding of the present invention, and the scope of the invention is not limited thereto.

EXAMPLE 1—MANUFACTURE OF PAINT
PROTECTION FILM 1

As a raw material for a polyether block-polyamide block copolymer, Arkema's Pebax® Rnew® 35R53 resin was provided. The raw material was placed into an extruder, melt-kneaded, and then extruded into a single-layer paint protection sheet. At this time, a melt kneading temperature was adjusted to be within 200-300° C. An extruded paint protection sheet was placed on a carrier film having a tension of 3000 kPa, in some cases 2157.4-3628.4 kPa, in a continuous process to provide a carrier film laminate, a paint protection film was prepared while the laminate was passed between a casting roller and a squeezing roller heated to a temperature of 10-120° C. Thereafter, a paint protection film having a thickness of about 150 μm was prepared by removing the carrier film.

EXAMPLE 2—MANUFACTURE OF PAINT
PROTECTION FILM 2

In Example 1, a raw material was changed to Arkema's Pebax® Rnew® 40R53 resin, and other conditions were the same as in Example 1 to prepare a paint protection film.

EXAMPLE 3—MANUFACTURE OF PAINT
PROTECTION FILM 3

In Example 1, a raw material was changed to Arkema's Pebax® Rnew® 55R53 resin, and other conditions were the same as in Example 1 to prepare a paint protection film.

EXAMPLE 4—MANUFACTURE OF PAINT
PROTECTION FILM 4

In Example 1, a raw material was changed to Arkema's Pebax® 5533 resin, and other conditions were the same as in Example 1 to prepare a paint protection film.

EXAMPLE 5—MANUFACTURE OF PAINT
PROTECTION FILM 5

In Example 1, a raw material was changed to Arkema's Pebax® 4533 resin, and other conditions were the same as in Example 1 to prepare a paint protection film.

EXAMPLE 6—MANUFACTURE OF PAINT
PROTECTION FILM 6

In Example 1, a raw material was changed to Arkema's Pebax® 3533 resin, and other conditions were the same as in Example 1 to prepare a paint protection film.

EXAMPLE 7—MANUFACTURE OF PAINT
PROTECTION FILM 7

In Example 1, a raw material was changed to Arkema's Pebax® Rnew® 25R53 resin, and other conditions were the same as in Example 1 to prepare a paint protection film.

Comparative Example 1—Preparation of
polyurethane film

Argotec's 49510 TPU (polyurethane) film having a thickness of 150 μm was purchased and applied.

Experimental Example 1—Evaluation of storage
modulus for each temperature

A storage modulus (En) of the films prepared in Examples 1 and 2 and Comparative Example 1 was evaluated for each temperature (n ° C.) through the DMA Q800 model of TA Instruments, according to ASTM D4065. The device applies a temperature control condition of 1 Hz, 2° C./min in a dynamic mechanical analysis (DMA) tension mode, and the storage modulus (En) was measured in MPa at n ° C. temperature (where n is 0, 10, 20, 30, 40, or 50° C.), and the results are shown in Table 1. An amplitude of 5 μm was applied, and a pre force of 0.01 N was applied.

All films were subjected to the above evaluation after conditioning for 15 days in an atmosphere of 23° C. and 50% RH.

Experimental Example 2—Evaluation of Curved Painted Surface Construction

Films prepared in Examples 1 and 2 and Comparative Example 1 were bonded to a painted surface of exterior parts (bonnet, roof panel, front panel, rear panel, trunk, doors, etc.) of BMW's 530e 2020MY, a member with a curved surface, at a temperature of 0-50° C., and then, appearance quality was visually evaluated, and the results are shown in Table 1. ○ means that a construction condition is good, Δ means slight sagging, slight wrinkles, slight lifting, etc., and x means that construction is impossible.

TABLE 1

| | Storage modulus En for each temperature | | | | | |
| --- | --- | --- | --- | --- | --- | --- |
| | E0 | E10 | E20 | E30 | E40 | E50 |
| Example 1 | 48 | 40 | 38 | 37 | 35 | 33 |
| Example 2 | 102 | 93 | 88 | 84 | 78 | 70 |
| Comparative Example 1 | 150 | 96 | 65 | 45 | 30 | 29 |

| | Storage modulus ratio En/E20 | | | | | |
| --- | --- | --- | --- | --- | --- | --- |
| | E0/E20 | E10/E20 | E20/E20 | E30/E20 | E40/E20 | E50/E20 |
| Example 1 | 1.26 | 1.05 | 1 | 0.97 | 0.92 | 0.87 |
| Example 2 | 1.16 | 1.06 | 1 | 0.95 | 0.89 | 0.80 |
| Comparative Example 1 | 2.31 | 1.48 | 1 | 0.69 | 0.46 | 0.45 |

| | Evaluation of painted surface construction for each temperature | | | | | |
| --- | --- | --- | --- | --- | --- | --- |
| | 0° C. | 10° C. | 20° C. | 30° C. | 40° C. | 50° C. |
| Example 1 | Δ | ○ | ○ | ○ | ○ | Δ |
| Example 2 | ○ | ○ | ○ | ○ | ○ | Δ |
| Comparative Example 1 | x | x | ○ | x | x | x |

Storage Modulus Units: MPa

Referring to Table 1, the examples prepared by applying a polyether block amide resin and a tension-controlled carrier film showed that storage modulus ratios E0/E20 and E10/E20 measured at 0° C. and 10° C. compared to a storage modulus E20 measured at 20° C. had good values of 0.9 or more and 1.3 or less. Storage modulus ratios E40/E20 and E50/E20 measured at 40° C. and 50° C. compared to a storage modulus E20 measured at 20° C. had good values of 0.7 or more and 1.1 or less. Accordingly, it was confirmed that relatively good appearance quality was exhibited even under harsh temperature conditions such as 0° C., 10° C., 40° C., and 50° C., when applied to a painted member having a curved surface.

Experimental Example 3–Measurement of Yellowness before and after UV Irradiation The yellowness (YI) and CIE Lab color space L*, a*, and b* values of films prepared in Examples 4 to 6 and Comparative Example 1 were measured in D65/10 mode according to ASTM E313 using Hunterlab's UltraScan PRO color meter. In addition, the prepared film was exposed to ultraviolet rays with a wavelength of 280-360 nm and an output of 3.0 W for 72 hours through a UVB lamp (SANKYO DENKI G15T8E), and then the yellowness and the L*, a*, and b* values were measured in the same way, and the results are shown in Table 2. |dYI| is an absolute value of the yellowness difference measured before and after the UV irradiation.

TABLE 2

| Before UV irradiation | L* | a* | b* | Yellowness | |
| --- | --- | --- | --- | --- | --- |
| Comparative Example 1 | 96.34 | 0 | 0.34 | 0.62 | |
| Example 3 | 96.76 | 0.01 | 0.37 | 0.69 | |
| Example 4 | 96.89 | 0.04 | 0.28 | 0.54 | |
| Example 5 | 96.94 | 0.03 | 0.24 | 0.46 | |
| Example 6 | 96.97 | 0.04 | 0.25 | 0.49 | |
| After UV irradiation | L* | a* | b* | Yellowness | \| dYI \| |
| Comparative Example 1 | 96 | −0.6 | 2.9 | 4.99 | 4.37 |
| Example 3 | 96.74 | −0.03 | 0.54 | 0.98 | 0.29 |
| Example 4 | 96.93 | −0.03 | 0.48 | 0.86 | 0.32 |
| Example 5 | 96.82 | −0.01 | 0.42 | 0.77 | 0.31 |
| Example 6 | 96.84 | −0.05 | 0.44 | 0.78 | 0.29 |

Referring to Table 2, it was found that examples did not show significant changes in yellowness and CIE Lab color space b* values even after UV irradiation.

Experimental Example 4—Measurement of Tear Strength

Samples prepared by cutting films prepared in Example 1 and Comparative Example 1 into 50 mm and 100 mm sizes were prepared and left for 2 minutes, and both ends of the sample were fixed with a jig using the UTM device of Kyungjin Hitech Co., and the tear strength was measured three times and the average was calculated, and the results are shown below.

Comparative Example 1—Tear Strength: 320.3 gf

Example 1—Tear Strength: 609.7 gf

Referring to this, the tear strength of the Example is superior to that of the Comparative Example, and as discussed above, it is considered one of the requirements for easy construction on a curved painted surface.

Eco-Friendliness—Whether Crude Oil-Based Raw Materials are Applied

A crude oil-based content and a content of eco-friendly raw material-derived materials of films prepared in Examples 7 and 1 to 3 were measured by 14C/12C isotope ratio analysis according to ASTM D6866 and are shown in Table 3.

TABLE 3

| Classification | Eco-friendliness (%) (Vegetable raw material-derived material content (%)) | Crude oil-based material content (%) | Total |
| --- | --- | --- | --- |
| Example 7 | 19 | 81 | 100 |
| Example 1 | 31 | 69 | 100 |
| Example 2 | 46 | 54 | 100 |

US 12,606,681 B2

17

TABLE 3-continued

| Classification | Eco-friendliness (%) (Vegetable raw material-derived material content (%)) | Crude oil-based material content (%) | Total |
|---|---|---|---|
| Example 3 | 65 | 35 | 100 |
| Comparative Example 1 | 0 | 100 | 100 |

According to Table 3, it was found that the Examples have a content of crude oil-based materials of 85% or less, and the Comparative Example using TPU has relatively low eco-friendliness due to no vegetable raw material content.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of manufacturing a paint protection film, the method comprising:

preparing a raw material including a polyether block amide copolymer;

melting and extruding the raw material to form a paint protection sheet; and preparing a laminate by forming a carrier film laminate by placing the paint protection sheet on a carrier film, passing the carrier film with the paint protection sheet thereon between rollers to compress, and then winding the carrier film laminate, wherein the carrier film has a tension of 2000 kPa or more and 4200 kPa or less before placing the paint protection sheet on top of the carrier film.

2. The method of claim 1, wherein a temperature for the melting is 200° C. to 300° C.

3. The method of claim 1, wherein the compressing is performed by passing the carrier film laminate between a plurality of rollers.

* * * * *